United States Patent [19]

Brems

[11] 4,271,727
[45] Jun. 9, 1981

[54] APPARATUS FOR CYCLOIDAL ACCELERATION AND DECELERATION WITH PARTIAL CONSTANT VELOCITY

[76] Inventor: John H. Brems, 32867 White Oaks Trail, Birmingham, Mich. 48010

[21] Appl. No.: 47,042

[22] Filed: Jun. 11, 1979

[51] Int. Cl.³ .......................................... B23B 17/00
[52] U.S. Cl. ................................. 74/813 R; 74/821
[58] Field of Search ............. 74/813 R, 821, 52, 822, 74/27, 816

[56] References Cited

U.S. PATENT DOCUMENTS

| 3,745,838 | 7/1973 | Brems | 74/27 |
|---|---|---|---|
| 3,789,676 | 2/1974 | Brems | 74/27 |
| 3,857,292 | 12/1974 | Brems | 74/52 |
| 4,018,090 | 4/1977 | Brems | 74/27 |
| 4,075,911 | 2/1978 | Brems | 74/816 |
| 4,089,228 | 5/1978 | Obra | 74/52 |
| 4,137,797 | 2/1979 | Brems | 74/52 |

Primary Examiner—Ronald Feldbaum
Attorney, Agent, or Firm—Barnes, Kisselle, Raisch & Choate

[57] ABSTRACT

A reversible rotary indexing mechanism capable of generating large indexing angles including those exceeding one revolution. A constant velocity rotary input is connected to a rotary output by an eccentric accelerating-decelerating drive means which, by reason of a shifting mechanism, is selectively disengageable with the output at a maximum velocity, zero acceleration condition, while at the same time a constant velocity drive from the input is connected to the output. Conversely, the constant velocity drive is disconnected at the same time that the accelerating-decelerating drive means is reconnected to accomplish deceleration. An output lock is also provided and actuators including composite cams can be utilized to accomplish the action of the shifting mechanism.

In addition, the mechanism can be used with higher harmonic components to increase the design flexibility with greater inherent dwell capabilities and significantly longer constant velocity ranges.

25 Claims, 30 Drawing Figures

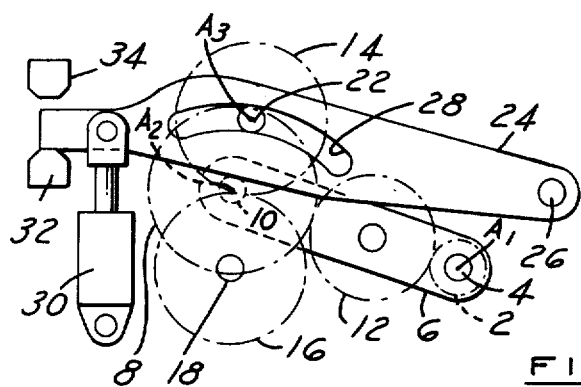
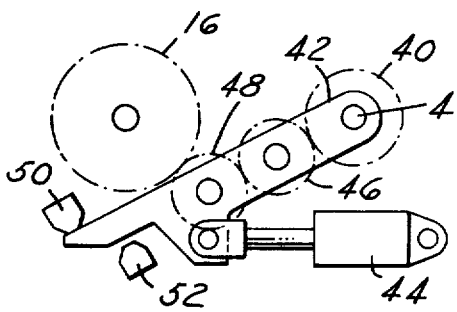
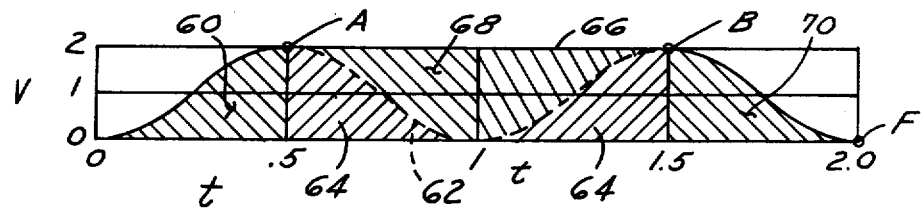
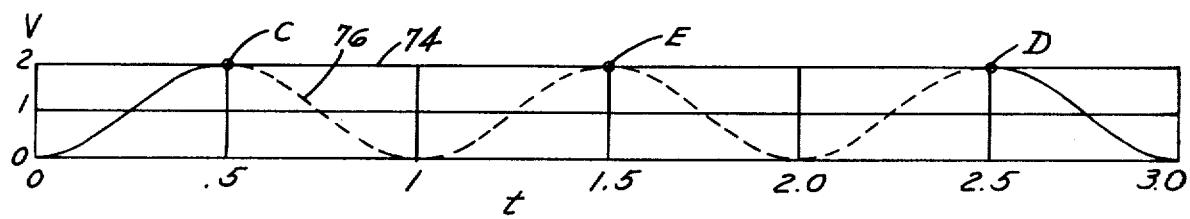
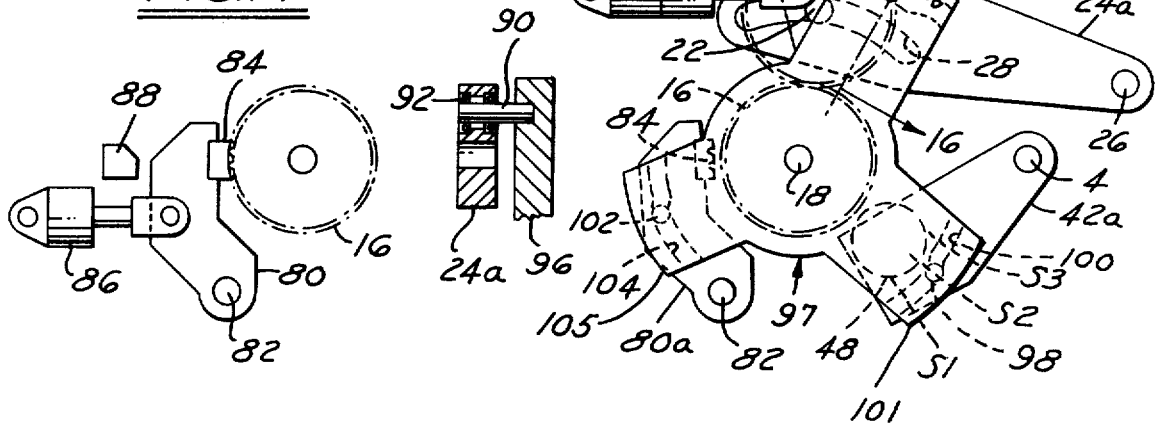

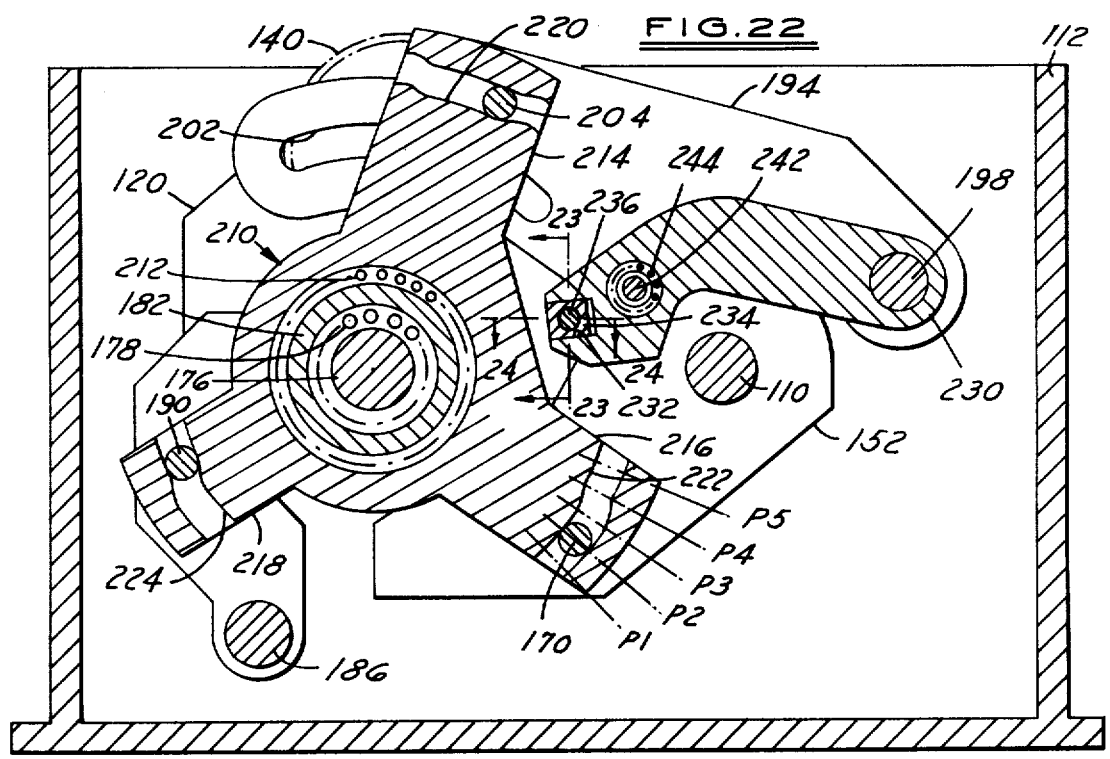
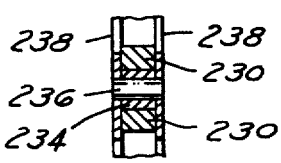
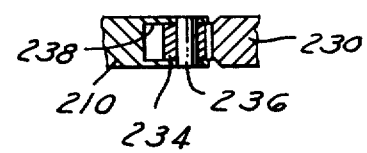
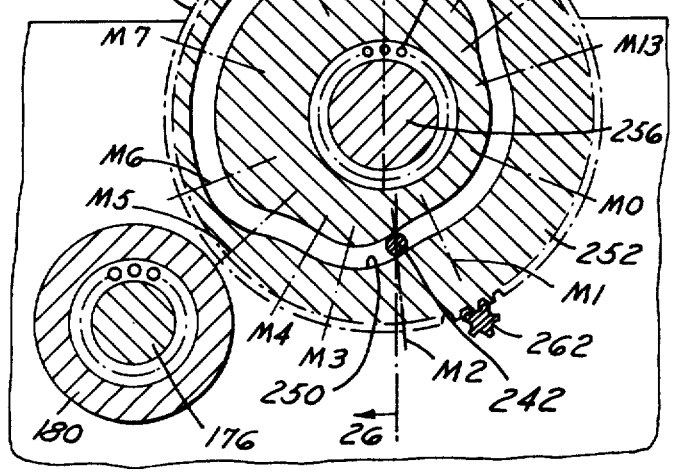
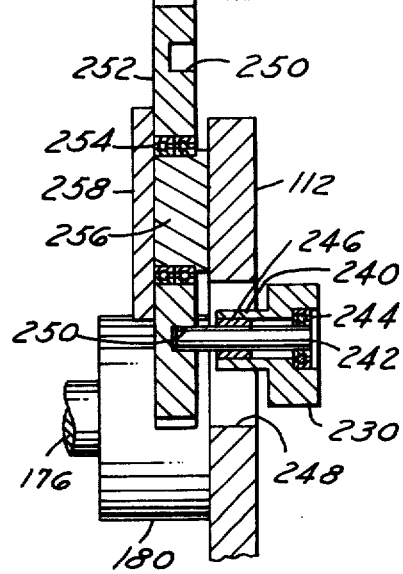

1

APPARATUS FOR CYCLOIDAL ACCELERATION AND DECELERATION WITH PARTIAL CONSTANT VELOCITY

FIELD OF INVENTION

Apparatus for machine drives to achieve cycloidal acceleration and deceleration with partial constant velocity.

BACKGROUND OF INVENTION

In my existing U.S. Pat. Nos. 3,789,676; 3,857,292; and 4,075,911, it was shown how cycloidal motions, with or without the addition of higher harmonic components, would be generated with simple gear or chain type mechanisms. A common characteristic of all the various mechanisms shown was that the output stroke was equal to the pitch circumference of a gear or sprocket. In the case of linear output systems, the linear output stroke was equal to the pitch circumference of the indexing gear or sprocket; in the case of rotary output systems, the output index angle was equal to the angle subtended by an arc on the output gear or sprocket whose length was equal to the pitch circumference of the eccentric index gear or sprockets. While these systems have been usefully employed in many applications, they are handicapped in generating long strokes by requiring indexing gears or sprockets which become impractically large.

It is one object of the present invention to provide an indexing system which is capable of generating an accelerated-decelerated index stroke during multiple revolutions of the index gear; accordingly, a proportionally smaller gear can be employed.

In such a multiple revolution gear index system, the natural dwell between the index strokes will become smaller as related to the input angle than is that same natural dwell for a single revolution index system.

It is another object of this invention to provide an indexing system in which the dwell between index strokes can be significantly extended and thereby to provide ample time for stoppage or reversal of the driving motor.

In a conventional cycloidal indexing system, the peak velocity reached at or near midstroke is approximately two times the average velocity during the stroke.

It is another object of this invention to provide an indexing system in which the peak velocity reached during the stroke is significantly less than two times the average velocity reached during the stroke.

Other objects and features of the invention will be apparent in the following description and claims in which the principles of the invention are set forth together with details of the structure which will enable a machine builder to utilize the invention, all in connection with the best modes presently contemplated for the practice of the invention.

BRIEF DESCRIPTION OF THE DRAWINGS

DRAWINGS accompany the disclosure and the various views thereof may be briefly described as follows:

FIG. 10, a side view of the mechanism of FIG. 1 altered for disengagement.

FIG. 11, a side view of an additional engageable mechanism to achieve constant velocity in the mechanism of FIG. 1.

FIG. 12, an illustrative velocity diagram for the mechanism of FIG. 11.

FIG. 13, a second illustrative velocity diagram for the mechanism of FIG. 11.

FIG. 14, a side view of an additional engageable mechanism to hold or lock the mechanism of FIG. 1.

FIG. 15, a side view of a system which combines the mechanisms of FIGS. 1, 10, 11 and 14, and provides a single cam mechanism for the actuations thereof.

FIG. 16, a section taken on line 16—16 of FIG. 15.

FIG. 22, a transverse section of the mechanism taken on line 22—22 of FIG. 17.

FIG. 23, a partial section of the mechanism taken on line 23—23 of FIG. 22.

FIG. 24, a partial section of the mechanism taken on line 24—24 of FIG. 22.

FIG. 25, a transverse section of the mechanism taken on line 25—25 of FIG. 17.

FIG. 26, a partial transverse section of the mechanism taken on line 26—26 of FIG. 25.

FIGS. 1 and 2 are simplified schematic drawings of one embodiment of an approximate cycloidal motion generating mechanism from my U.S. Pat. No. 3,789,676. An input gear 2 is mounted on an input shaft 4 which is journalled in a suitable housing or frame and driven by an appropriate external drive system. Also journalled on the input shaft 4 is a tangential link 6 which oscillates thereon as will be described. A driving gear 8 is mounted on a shaft 10 journalled in the outboard end of the link 6, and an intermediate gear 12, also journalled in the link 6, is formed to mesh with the input gear 2 and driving gear 8. An eccentric gear 14 is mounted on the shaft 10 with an eccentricity approximately equal to its pitch radius. This eccentric gear 14 meshes with an output gear 16 mounted on a shaft 18 also journalled in the housing or frame. A radial link 20 is also journalled on the output shaft 18 at its one end; at its other end, the radial link 20 is journalled to a stub shaft 22 mounted concentrically on the eccentric gear 14. It is the purpose of this radial link 20 to keep the eccentric gear 14 in mesh with the output gear 16 as the eccentric gear 14 moves through its rotational and translational path.

Figure 1:
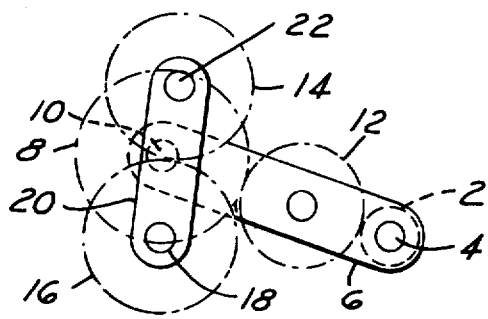
FIG. 1, a schematic side view of an accelerating-decelerating mechanism as disclosed in my U.S. Pat. No. 3,789,676.

When the mechanism is in the position shown in FIG. 1, it is in a natural dwell position, i.e., a small rotation of the input gear 2 causes a corresponding rotation of the driving gear 8 and the eccentric gear 14. This rotation of the eccentric gear 14 is accompanied by a corresponding movement of the shaft 22 about the shaft 18, such that the gear 14 literally rolls about the output gear 16 which remains stationary or in dwell.

Figure 3:
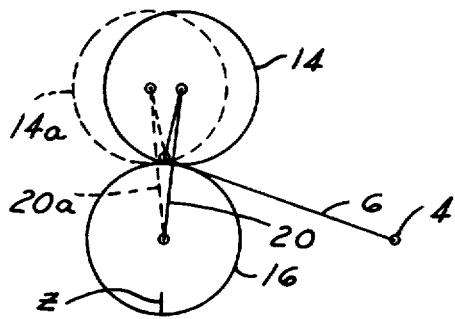

A qualatative schematic representation of the motion of the output gear 16 during a complete 360° rotation of the driving gear 8 and eccentric gear 14, at 90° intervals, is shown in FIGS. 3-6. An arbitrary radial marker line has been added to the output gear 16 to show its position change at these intervals. FIG. 3 shows the position of all gears at the center of the dwell, which is the same configuration as shown in FIG. 1. Additionally, a second position is shown in which the driving gear 8 and eccentric gear 14 have been rotated 10° counterclockwise (as driven by intermediate gear 12 and input gear 2). The rolling action of the gear 14 on the output gear 16 which remains substantially stationary during this 10° interval can therefore be visualized. In this second position, the components are redesignated by the callout suffix letter a.

Figure 4:
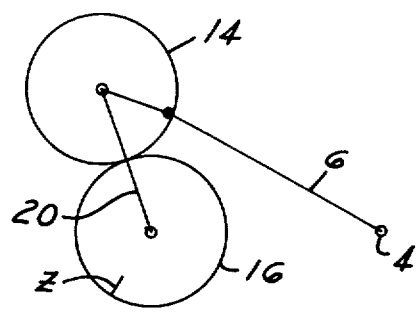
FIGS. 3 to 6, schematic sequential position diagrams of the mechanism shown in FIG. 1.

As the gears 8 and 14 continue to rotate counterclockwise, the output gear 16 is accelerated and moves in the clockwise direction. After 90° of this rotation of gears 14 and 8, the position shown in FIG. 4 is reached. At this point, the acceleration of gear 16 in the clockwise direction has reached its approximate maximum, and the velocity of the gear 16 in the clockwise direction is approximately equal to its average velocity.

Figure 5:
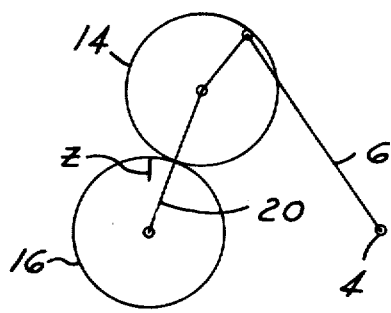

As the gears 8 and 14 continue, their rotation counterclockwise from their position shown in FIG. 4, the output gear 16 continues to accelerate, at a decreasing rate, in the clockwise direction. After an additional 90° of rotation of gears 14 and 8, the positions shown in FIG. 5 is reached. At this point, the acceleration of the gear 16 has substantially returned to zero, and its velocity in the clockwise direction has reached an approximate maximum which is double the average velocity.

Figure 6:
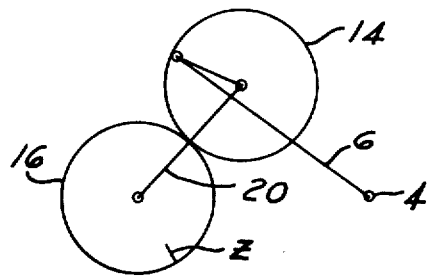

As the gears 8 and 14 continue to rotate counterclockwise from the position shown in FIG. 5, the output gear 16 continues to rotate clockwise but is decelerating. After an additional 90° of rotation of gears 8 and 14, or a total of 270° from the start of the cycle, the position shown in FIG. 6 is reached. At this point, the deceleration of the output gear 16 is at or near maximum, while the velocity of the output gear 16, still in the clockwise direction, has slowed down to approximately its average velocity.

As the gears 8 and 14 continue to rotate counterclockwise from the position shown in FIG. 6, the output gear 16 continues to rotate clockwise, but is still decelerating, though now at a decreasing rate. After an additional 90° of rotation of gears 8 and 14, or a total of 360° from the start of the cycle, the position shown in FIG. 3 is again reached, with the output gear 16 having completed one revolution and is now again in dwell.

It can be seen, therefore, that as the input gear 2 is driven by some external power means at a substantially constant angular velocity, the gears 8 and 14 are driven by the intermediate gear 12. Gears 8 and 14 have an angular velocity which is determined by the superposition of the effect of the oscillation of link 6 about shaft 4 on the velocity created by the input gear 2 so gears 8 and 14 do not rotate as a constant angular velocity. And the oscillation of the gear 14 along the arcuate path controlled by radial link 20 and created by its eccentric mounted on shaft 10 creates another superposition on the velocity of the output gear 16. With the proportions shown in FIGS. 1-6, the output gear 16 will come to a complete stop or dwell once in each revolution, since the pitch diameters of gears 14 and 16 are shown as being equal. If gear 16 were twice as large as gear 14, it would experience two complete stops per revolution. And if the gear 16 were replaced by a rack, the index stroke of that rack would be the pitch circumference of the gear 14. In all cases, whether the output member is a rotating gear as gear 16 or a linearly moving rack, the output stroke is equal to the pitch circumference of the gear 14. In the mechanism to be subsequently described, the output gear 16 has the same diameter as the gear 14 but this is a convenience, not a necessity.

Furthermore, if the output member driven by the gear 14 is a linearly moving rack, and if the centerline of shaft 10 passes through the pitch line of gear 14, then, as the link 6 becomes longer and longer, the output motion of the output rack member more closely approaches true cycloidal motion.

With the mechanism shown in FIG. 1, the output motion of gear 16 has the broad characteristics of cycloidal motion, but distortions exist which are caused by the short length of link 6 and the arcuate rather than linear path of shaft 22. To some degree, these distortions can be compensated for by the proper choice of gear ratio between input gear 2 and driving gear 8 and the ratio of the length of link 6 to the center distance between input shaft 4 and output shaft 18.

In order to determine the exact quantitative kinematic characteristics of the mechanism shown in FIG. 1, it is necessary to use numerical methods for which a programmable calculator or computer is a great convenience, but not a necessity. Setting up classical equations of motion and then differentiating to find velocity and acceleration is excessively laborious and time consuming. But numerical calculation for the exact determination of the output shaft position for a series of discrete positions of the input shaft can be accomplished using straightforward geometry and trigonometry. By making these calculations at sufficiently small intervals, it becomes possible, by numerical differentiation, to obtain the velocity, and then by numerically differentiating a second time, to obtain the accelerations. These calculations can be repeated as required for different values of the geometrical parameters to closely approximate the conditions to be described below.

Pure cycloidal motion displacement in unitized coordinates and using radian angular notation is given by:

$$S = 1/2\pi(2\pi t - \sin 2\pi t) \tag{1}$$

where t is the input variable having a range of 0 to 1 for one cycle of cycloidal motion, and S is the output displacement, also having a range of 0 to 1.

The velocity is obtained by differentiation, whereupon:

$$V = 1 - \cos 2\pi t \quad (2)$$

The acceleration is obtained by differentiating again, whereupon:

$$A = 2\pi \sin 2\pi t \quad (3)$$

Figure 7:
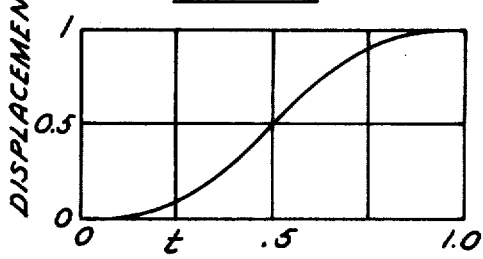
FIG. 7, a displacement diagram for cycloidal motion, over one cycle.
Figure 8:
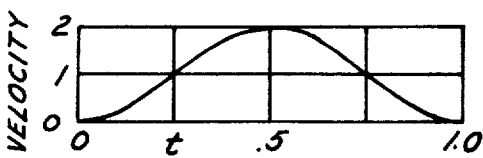
FIG. 8, a velocity diagram for cycloidal motion, over one cycle.
Figure 9:
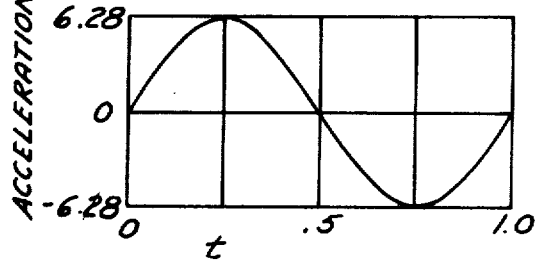
FIG. 9, an acceleration diagram for cycloidal motion, over one cycle.

The values for equations (1), (2), and (3) are graphically portrayed in FIGS. 7, 8 and 9. These are the curves representing the kinematic conditions for pure cycloidal motion. As noted above, the mechanism of FIG. 1 can be made to generate approximate cycloidal motion of the output gear 6 for a constant angular velocity of the input gear 2 with a reasonable degree of accuracy by a proper choice of geometric parameters determined by numerical calculation and successive approximation.

The specific characteristics of cycloidal motion which are important and relevant to the mechanism of this invention are:

1. That the acceleration be substantially zero at the beginning and end of the index stroke as generated in the output gear 16. This creates a relatively long dwell which is useful for the shifting to be accomplished.

2. That the peak velocity reached by the output gear 16 during its index stroke by substantially double its average velocity over this stroke, and, further, that this peak velocity be reached at substantially the middle of the output stroke.

It will be noted that at midstroke, $S = \frac{1}{2}$ and $t = \frac{1}{2}$, that the acceleration is zero and the instantaneous velocity has a peak value of 2 which is twice the average velocity. If, at this point, as shown by the conditions in FIG. 5, the eccentric gear 14 is disengaged from the output gear 16 by some suitable means, and an alternate appropriate constant ratio driving means is engaged between the input shaft 4 and output gear 16, then the output gear 16 will continue to rotate at a constant velocity having a peak value of 2.

In FIG. 10, an illustrative means of controlling the engagement of the eccentric gear 14 with the output gear 16 which permits selective engagement and disengagement of the gears is shown. A control link 24 is pivotally connected to the housing through a shaft 26. An arcuate slot 28 which, for one position of the control link 24, has its center of curvature coincident with the center of the output gear 16, is formed in the control link 24. The stub shaft 22 on gear 14 fits into and is controlled by the slot 28, the radial link 20 of FIG. 1 being removed. It can be seen that the arcuate slot 28 in the control link 24 can perform the same function, which is to keep the centers of the gears 14 and 16 equidistant and their pitch lines in contact, if the center of curvature or arcuate slot 28 coincides with the centerline of the gear 16. The control link 24 is actuated about the shaft 26 between two positions by a cylinder 30 also mounted to the housing. These two positions are controlled by stops 32 and 34; with the cylinder 30 retracted, the link 24 is held against stop 32 and the slot 28 is positioned to keep the gears 14 and 16 in engagement; with the cylinder 30 extended, the link 24 is held against stop 34 and the slot 28 is positioned to hold the gear 14 out of engagement with gear 16. This mechanism of FIG. 10 is one illustrative means of controlling the engagement and disengagement of the eccentric gear 14 with the output gear 16.

An illustrative constant ratio driving means between the input shaft 4 and the output gear 16 is shown in FIG. 11. A secondary input gear 40 is mounted on the input shaft 4 adjacent the other input gear 2. A pivoted link 42 is journalled on the input shaft 4 in suitable bearings; at its other end, this link 42 is actuated by a cylinder 44 mounted to the housing. An intermediate gear 46 and drive gear 48 are journalled in the link 42, with the gear 46 in mesh with both gears 40 and 48. The link 42 has two positions controlled by stops 50 and 52 on the housing. With the cylinder 44 extended, the position of link 42 is determined by stop 50 and gear 48 is in pitch line contact with the output gear 16; with the cylinder 44 retracted, the position of link 42 is controlled by stop 52 and the gear 48 is completely out of mesh with the output gear 16. The pitch line velocity of gear 48 exactly matches the pitch line velocity of gear 16 when output gear 16 has reached its peak velocity as driven by the cycloidal mechanism of FIGS. 1 and 10.

It can be seen, therefore, that if both cylinders 30 and 44 are extended at the midpoint of the cycloidal drive mechanism cycle, the output gear 16, having reached its peak velocity during $\frac{1}{2}$ a revolution of cycloidal acceleration by eccentric gear 14, is disengaged by gear 14 and engaged by gear 48 which then continues to drive the output gear 16 at that peak velocity.

This condition is shown by the velocity versus time diagram of FIG. 12. During the first half revolution of the output gear 16, which is reached as t reaches 0.5, the velocity reaches a peak value of 2, as shown by point A on the velocity curve of FIG. 12. The displacement or movement is classically given as the area under the velocity curve and is shown as 60 in FIG. 12 and has a value of 0.5; it will be noted that the portion of the velocity curve of FIG. 12 for the value of t from 0 to 0.5 is the same as the curve of FIG. 8 over that same range of t.

If, at the time when t reaches 0.5, as shown at A, the eccentric gear 14 remains in mesh with the output gear 16, the velocity of that output gear will follow the dashed line 62, as shown in FIG. 12, reaching 0 at t=1, then building up to 2 again at t=1.5, as shown by point B. During this interval, from point A to point B, the output gear 16 will have moved through a displacement of one revolution, as shown by the area 64 under the velocity curve 62 within this interval.

If, however, at the time when t reaches 0.5, the eccentric gear 14 is disengaged from the output gear 16, as by extending the cylinder 30 of the illustrative mechanism of FIG. 10, and, if simultaneously, the output gear 16 is driven by a constant velocity mechanism as by extending the cylinder 44 of the illustrative mechanism of FIG. 11, then the velocity of the output gear 16 will be given by the line 66 of FIG. 12. The total movement of the output gear, during the interval between points A and B (from t=0.5 to t=1.5, will be the area under the line 66 between A and B or 2 revolutions, as shown by the sum of the areas 64 and 68. If further, at t=1.5 (and at point B), the constant velocity mechanism of FIG. 11 is disengaged and the indexing mechanism of FIG. 10 is re-engaged, the velocity of the output gear 16 again reaches a value of 0 at t=2. The displacement of the output gear 16, during this deceleration is given by the area 70, which has a value of $\frac{1}{2}$ revolution.

With no shifts at points A or B, the output gear 16 velocity will follow the common curve from t=0 to t=0.5, then follows the curve 62 from t=0.5 to t=1.5, and finally follows the common curve from t=1.5 to t=2. The gear 16 will make two revolutions during the interval, as given by the sum of areas 60, 64, and 70. In essence, the gear 16 makes two simple index cycles.

However, if the shifts, described above, take place at A and B, the velocity of the output gear 16 follows the common curve from t=0 to 0.5, then follows the curve (line) 66 from t=0.5 to t=1.5, and finally follows the common curve from t=1.5 to t=2. The gear 16 will make three revolutions during the total interval, as given by the sum of the areas 60, 64, 68, and 70. With shifting, the output gear 16 makes three revolutions in the total interval t=0 to t=2, whereas, without shifting, the gear 16 makes only two revolutions in that same interval. With shifting, the average velocity is 3/2 (S=3, t=2) while the peak velocity is 2. The ratio of the peak velocity to the average velocity is given by 2/(3/2) or 4/3. Without shifting, the average velocity is 2/2 (S=2, t=2) or 1; and the ratio of the peak velocity is given by 2/1 or 2. It can be seen, therefore, that this technique of shifting greatly reduces the ratio of peak velocity to average velocity for an indexing mechanism in which it is employed.

It is clear that the shifts which can be created by the mechanisms of FIGS. 10 and 11 can only take place during that small range of time when the accelerating-decelerating mechanism of FIG. 10 is driving, or would drive, the output gear at maximum velocity, which, of course, is when the acceleration is at or near 0; this corresponds to a position for this mechanism as schematically shown in FIG. 5. A shift at any other time would create a velocity discontinuity of the output gear 16, which implies a theoretically infinite acceleration, and this is greatly to be avoided. That interval of time and position, during which the mechanism of FIG. 10 drives the output gear at substantially peak velocity (schematically shown in FIG. 5), will be subsequently referred to as the "CV window", where CV denotes constant velocity.

Figure 2:
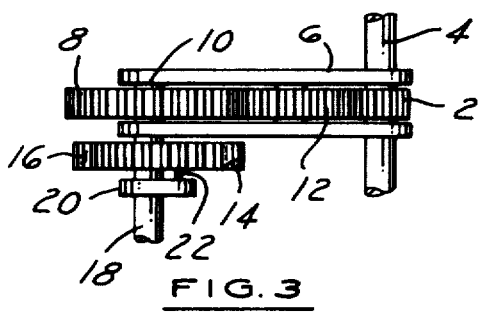
FIG. 2, a top view of the mechanism shown in FIG. 1.

The mechanism of FIGS. 1 and 2 as modified by FIG. 10 will be subsequently referred to as the "AD mechanism" where AD denotes accelerating-decelerating; and the mechanism of FIG. 11 will be subsequently referred to as the "CV mechanism" where CV denotes constant velocity. The interval which corresponds to that time and position when the AD mechanism is temporarily in dwell, and the output gear 16 is stationary, will be referred to as the "dwell window". This corresponds to a position of the AD mechanism as shown in FIG. 10, and as schematically shown in FIG. 3. A time interval from a dwell window to a CV window or from a CV window to a dwell window will be subsequently referred to as a module. (This also corresponds to the time or input shaft angle required to rotate the eccentric gear 14 through one-half revolution.) It can be seen that such a module will have a time range of 0.5 as from t=0 to t=0.5 or from t=1.5 to t=2, etc. It can further be seen that during any such module, the output gear 16 will rotate through one half revolution when driven by the AD mechanism; and the output gear 16 will rotate one full revolution when driven by the CV mechanism for one module.

A second velocity diagram based on a longer engagement of the CV mechanism is shown in FIG. 13. During the first module from t=0 to t=0.5, the output gear 16 is driven by the AD (accelerating-decelerating) mechanism. At the end of the module, the output gear reaches its peak velocity and is in a CV (constant velocity) window, having rotated one-half revolution during this interval and the point C is reached. If, during this CV window, the AD mechanism (FIG. 10) is disengaged and the CV mechanism (FIG. 11) is engaged, the motion of the output gear is described by line 74 of FIG. 13. The output gear 16 continues to rotate at constant velocity for four modules from t=0.5 to t=2.5, and makes four revolutions during this time, and reaches another CV window as shown at point D. At this point D, the CV mechanism is disengaged and the AD mechanism is re-engaged, and during the last module of time from t=2.5 to t=3.0, the output gear is decelerated to a dwell window making ½ revolution during this interval.

During the total interval from t=0 to t=3, which consists of six modules, the output gear 16 will make a total of five revolutions, which is the sum of ½ revolution during the first (accelerating) module, four revolutions during the four modules at constant velocity between points C and D, and ½ revolution during the final decelerating module. The average velocity is, therefore, 5/3 (5 revolutions in 3 time units); and the ratio of peak velocity to average velocity is 2/(5/3)=1 1/5. It can be seen, therefore, that as the proportion of constant velocity movement is increased, relative to a total cycle, the lower is the ratio of peak velocity to average velocity.

At the end of the first module when the first CV window was reached at point C, if no shift had taken place by engaging the CV mechanism and disengaging the AD mechanism, the motion of the output gear 16 would have been described by the dotted path 76, until the next CV window appeared two modules later at point E, at which a shift could take place.

During the constant velocity movement of the output gear 16 along line 74, this same CV window was passed at point E. Had the shift taken place at E, rather than going on to point D, the same movement pattern would have occurred as was described in connection with FIG. 12.

From the foregoing, it may be stated that CV windows appear at intervals of two modules, and that during such a two module interval, the output gear 16 will rotate through two revolutions while being driven by the CV mechanism, or, it will rotate through one revolution if, instead, it is driven by the AD mechanism. If, during a CV window, the AD mechanism is disengaged and the CV mechanism is engaged, this will be termed an "upshift"; similarly, if, during a CV window, the CV mechanism is disengaged, and the AD mechanism is engaged, this will be termed a "downshift".

The motion of the output gear 16, represented by FIG. 12, may then be simply redescribed as follows. During the first time module, the output gear 16 accelerates to maximum velocity and rotates through one-half revolution during this acceleration. It reaches a CV window and the mechanisms upshift. The output gear 16 is then rotated at constant velocity for an interval of two modules, while it makes two revolutions. It then reaches another CV window and the mechanisms downshift. During the final module, the output gear 16 rotates through ½ revolution while decelerating to a standstill at a dwell window.

The motion of the output gear 16 represented by FIG. 13 may also be redescribed as follows. During the first time module, the output gear 16 accelerates to a maximum velocity and rotates one half revolution thereby; it reaches a CV window and the mechanisms upshift. The output gear 16 is then rotated at constant velocity for an interval of four modules, while it makes four revolutions. (It passed a CV window after two modules but no shift took place.) After the aforesaid four modules, as the next CV window is reached, the mechanisms downshift. During this sixth and final module, the output gear rotates through ½ revolution, while decelerating to a standstill at a dwell window.

FIG. 12 illustrates two modules of constant velocity within a total cycle of four modules; FIG. 13 illustrates four modules of constant velocity within a total cycle of six modules. Similarly, it can be seen that it is possible to construct a cycle of six modules of constant velocity within a total cycle of eight modules resulting in a total output of seven revolutions. Going still further, it is possible to construct a cycle of eight modules of constant velocity within a total cycle of ten modules resulting in a total output of nine revolutions. In a general sense, a cycle can be created having N modules, where N must be even and 2 or larger; then the number of modules of constant velocity will be N−2 and the total output will be N−1 revolutions.

Since the width of a dwell window is fixed with respect to a given module, the ratio of that dwell window with respect to the overall cycle will decrease as the number of modules in a cycle increases. In conventional applications for this invention, the input shaft 4 will be driven by a suitable prime mover such as an electric motor, and standard gear reducer; and that prime mover, and the input shaft, will be stopped at the end of each cycle, to restart at the beginning of the next cycle. Such a stopping and starting point for the input shaft most advantageously occurs during a dwell window, since at that time, the output shaft is accurately positioned and the accelerating and decelerating characteristics are determined by the AD mechanism with minimal distortion due to the stopping or starting of the input shaft 4. Therefore, it is desirable to develop a means of extending the dwell period beyond that which is created by the natural dwell characteristics of the AD mechanism.

In FIG. 14, one means of achieving such an expansion of the dwell, or standstill time for the output gear 16, is shown. A holding lever 80 is mounted on a shaft 82 which is suitably journalled in the mechanism frame or housing. This holding lever 80 has mounted to it a rack segment 84 which is formed to mesh with the teeth of the output gear 16. The holding lever 80 is actuated through a small angle about the shaft 82 by a cylinder 86. With the cylinder 86 extended, as shown in FIG. 14, the teeth of the rack 84 mesh with the teeth of the output gear 16 and thereby effectively hold or lock it in position to prevent it from rotating. With the cylinder 86 retracted, the holding lever 80 is rotated slightly counterclockwise on the shaft 82 to bring the lever 80 into contact with a fixed stop 88 mounted on the frame. In this position of the lever 80, the rack 84 is no longer in mesh with the teeth of the output gear 16, and the output gear 16 is therefore free to rotate as driven by the AD mechanism or the CV mechanism. The entire mechanism shown in FIG. 14 will be referred to as the "holding" mechanism.

Referring to FIG. 12, it can be seen that at the end of the fourth module when t=2, the AD mechanism has brought the output gear 16 to a temporary standstill as shown by point F. At this time, it is possible to engage the holding mechanism by extending cylinder 86, and simultaneously disengaging the AD mechanism by extending cylinder 30 (FIG. 10). The output gear 16 therefore remains stationary and locked even though the input shaft continues to rotate, driving both the AD mechanism and the CV mechanism, which are both disengaged from the output gear 16.

The AD mechanism may be re-engaged with the output gear 16 and the holding mechanism simultaneously disengaged at any time or point that the AD mechanism is in a dwell window position. These dwell window positions occur whenever the AD mechanism is in the position shown in FIGS. 1, 3 and 10; and, as can be seen from FIGS. 12 and 13 in the spacing of the 0 velocity points for unshifted movement, the time spacings of dwell windows are always two modules apart, just as the CV windows are also always spaced two modules apart.

In the foregoing descriptions, the three separate mechanisms which drive or hold the output gear 16 are each shown as being actuated and controlled by separate independent cylinders. An alternate means for actuating and controlling all three mechanisms with a single cylinder is schematically shown in FIGS. 15 and 16. Where elements are functionally identical, but slightly modified by elimination of their actuating cylinder connection, a suffix "a" is added to their identifying number. The control link 24a is mounted on the shaft 26; the arcuate slot 28 controls the stub shaft 22 mounted concentrically on the eccentric gear 14; the remainder of the gear train is the same as in FIG. 10 but is omitted for clarity. The control link 24a is not directly actuated by a cylinder (as in FIG. 10), but is controlled by a cam follower roller 90 mounted therein through bearings 92 (FIG. 16). This cam follower roller 90 is engaged in a cam slot 94 in one arm 96 of a spider cam 97 journalled on the output shaft 18.

The CV mechanism is similarly actuated and controlled. The link 42a is journalled on the input shaft 4 and supports the drive gear 48; the gear drive train is again omitted for clarity and is the same as in FIG. 11. Whereas, in FIG. 11, the link 42 was actuated by a cylinder, the link 42a in FIG. 15 is actuated and controlled by a cam follower roller 98 mounted in the link 42a through bearings similar to those shown in FIG. 16. This cam follower roller 98 is engaged in a cam slot 100 in another arm 101 of the spider cam 97.

The holding mechanism again consists of a link 80a mounted on a shaft 82 journalled in the frame; the link 80a supports a rack section 84 and is actuated and controlled by a cam follower roller 102 engaged in a cam slot 104 in the third arm 105 of the spider cam 97. The cam follower roller 102 is mounted in the link 80a through bearings comparable to those shown in FIG. 16.

The spider cam 97 is actuated about its pivot axis on the output shaft 18 by a three position cylinder 106 mounted in the frame. As shown in FIG. 15, the cylinder 106 and the spider cam 97 are in their middle position as indicated by the reference line S2 on arm 101 of spider cam 97 intersecting the cam follower roller 98. In this middle position, the cam slot 94 on spider arm 96 acting on cam follower roller 90 causes the control link 24a to engage the eccentric gear 14 with the output gear 16. In this same middle position for the spider cam 97, the cam slot 100 on arm 101 acting on cam follower roller 98 causes the link 42a to keep the gear 48 slightly out of engagement with the output gear 16; similarly, the cam slot 104 on spider arm 105 acting on the cam follower roller 102 positions the link 80a to keep the rack section 84 slightly out of engagement with the output gear 16. In essence, the middle position of the spider cam 97 engages the AD mechanism and disengages the CV mechanism and the holding mechanism.

With the cylinder 106 retracted, the spider cam 97 is rotated on the output shaft 18 through a small angle counterclockwise bringing the reference line S1 into intersection with the cam follower roller 98. In this full counterclockwise position of the spider cam 97, the cam slot 94 in arm 96 acting on the cam follower roller 90 causes the eccentric gear 14 to be disengaged from the output gear 16; similarly, the cam slot 100 in arm 101 acting on the cam follower roller 98 causes the drive gear 48 to be disengaged from the output gear 16; and the cam slot 104 in arm 105 acting on the cam follower roller 102 causes the rack section 84 to be engaged with the output gear 16 causing it to be held in a locked position.

With the cylinder 106 fully extended, the spider cam 97 is rotated on the output shaft 18 through a small angle in the clockwise direction bringing the reference line S3 into intersection with the cam follower roller 98. In this full clockwise position of the spider cam 97, the cam slot 94 acting on the cam follower roller 90 causes the eccentric gear 14 to be disengaged from the output gear 16; similarly, the cam slot 100 acting on the cam follower roller 98 causes the drive gear 48 to be engaged with the output gear 16; and the cam slot 104 acting on the cam follower roller 102 causes the rack section 84 to be disengaged from the output gear 16.

In summary, with the spider cam 97 in its fully counterclockwise position S3, the holding mechanism is engaged, while the AD mechanism and CV mechanism are disengaged; with the spider cam 97 in its middle position S2, the AD mechanism is engaged while the holding and CV mechanisms are disengaged; and with the spider cam 97 in its clockwise position S1, the CV mechanism is engaged, while the holding and AD mechanisms are disengaged. The use of a single spider cam 97 makes it possible for one cylinder 106, to control all three mechanisms which drive or hold the output gear 16; the detail design of the cam slots 94, 100, and 104 makes it possible to assure that the output gear 16 is always engaged by at least one element that is used for its drive or holding which are the eccentric gear 14, the CV drive gear 48, or the rack section 84. The use of the cam slots 94, 100, and 104 keeps the gear tooth separation loads mechanically close coupled, and they are not reflected back to the actuating cylinder 106 whenever the spider cam 97 is in one of the three designated positions, S1, S2, or S3. Finally, the use of the single spider cam 97 makes it possible, as will be shown, to provide a simple automatically time or synchronized mechanical means to actuate the spider cam 97 in place of the cylinder 106 presently shown.

The mechanisms schematically illustrated in FIGS. 1, 2, 10, 11, 14, 15, and 16 were essentially schematic in nature to indicate the principles of operation of this invention. The combined embodiment of these subassemblies, suitably refined and detailed, is shown in FIGS. 17-28.

The Acceleration-Deceleration (AD) Mechanism

Figure 19:
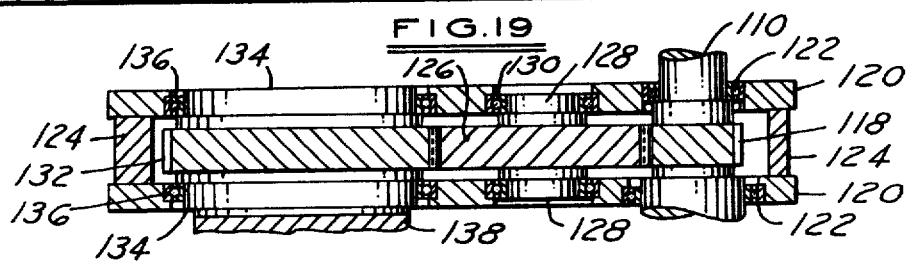
FIG. 19, a transverse section of the mechanism taken on line 19—19 of FIG. 18.

Referring to FIGS. 17, 18, 19, 27 and 28, an input shaft 110 is journalled in a housing 112 through bearings 114 and 116. The input gear 118 for the AD mechanism is integrally formed on the input shaft 110. The tangential link is made up of two side plates 120 journalled on the input shaft 110 through bearings 122; the side plates 120 are separated by and bolted together through spacer blocks 124 (FIG. 19). An intermediate gear 126 formed with integral shouldered stub shafts 128 is journalled in the side plates 120 through bearings 130; this intermediate gear 126 is also formed to mesh with the input gear 118. A driving gear 132, also formed with integral shouldered stub shafts 134, is also journalled in the side plates 120 through bearings 136 (FIG. 19); this driving gear 132 is formed to mesh with the intermediate gear 126, and therefore is driven through the intermediate gear 126 from the input gear 118. A cheekplate 138 is bolted to one side of the stub shaft 134 of the driving gear 132; this cheekplate 138 in turn mounts the eccentric gear 140. It will be noted that the centerline of rotation of the driving gear 132 is very close to the pitch line of the eccentric gear 140. A cam follower roller 142 is concentrically mounted in the eccentric gear 140 through bearings 144; it will be used to control the position of the eccentric gear as will be subsequently described. The items numbered 118-144 constitute the AD mechanism of this embodiment.

The Constant Velocity (CV) Mechanism

Figure 17:
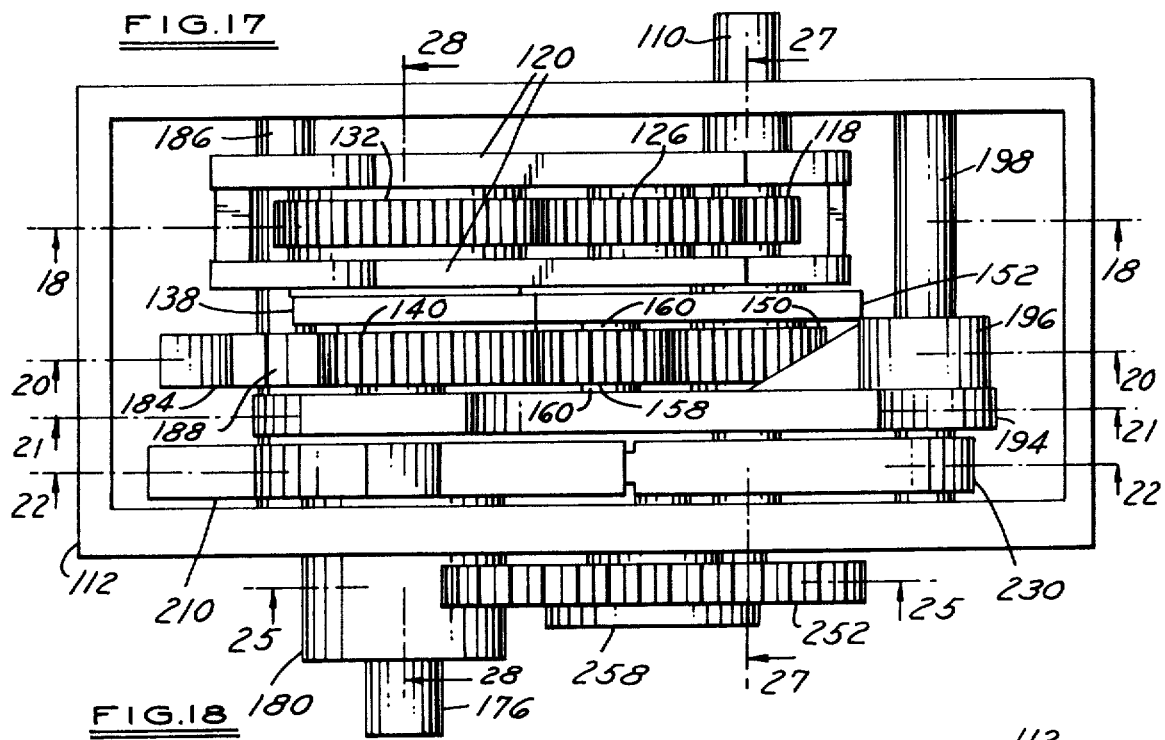
FIG. 17, a plan view of one embodiment of the mechanism of this invention.
Figure 18:
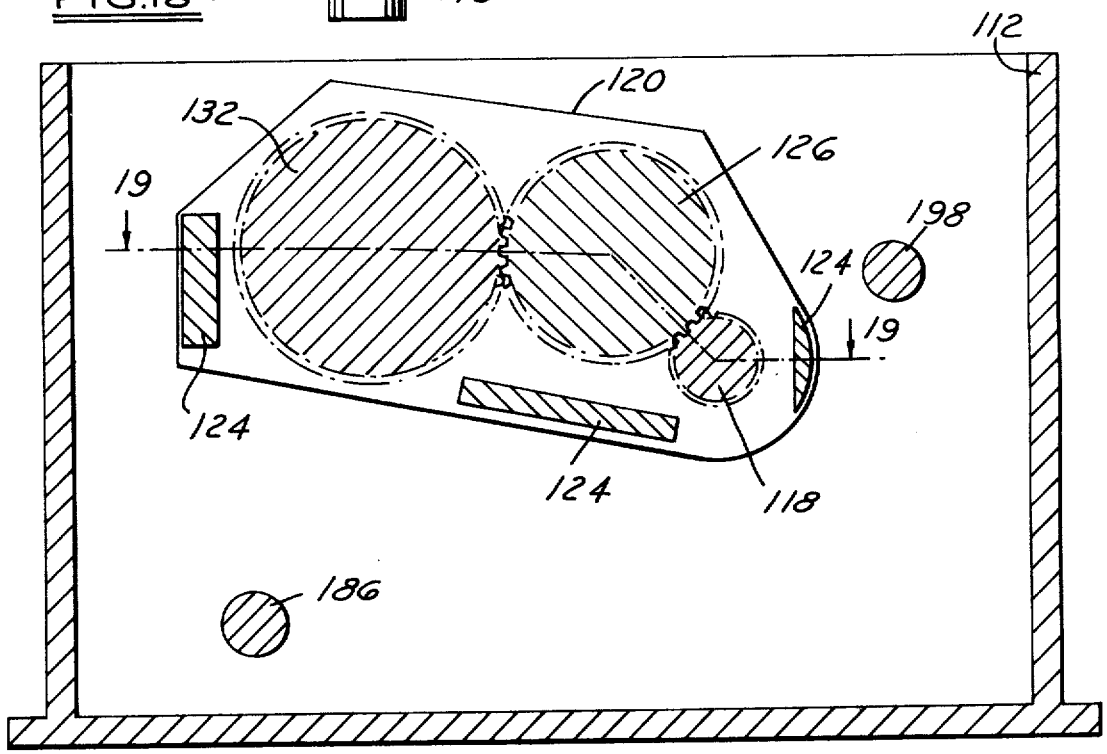
FIG. 18, a transverse section of the mechanism taken on line 18—18 of FIG. 17.
Figure 20:
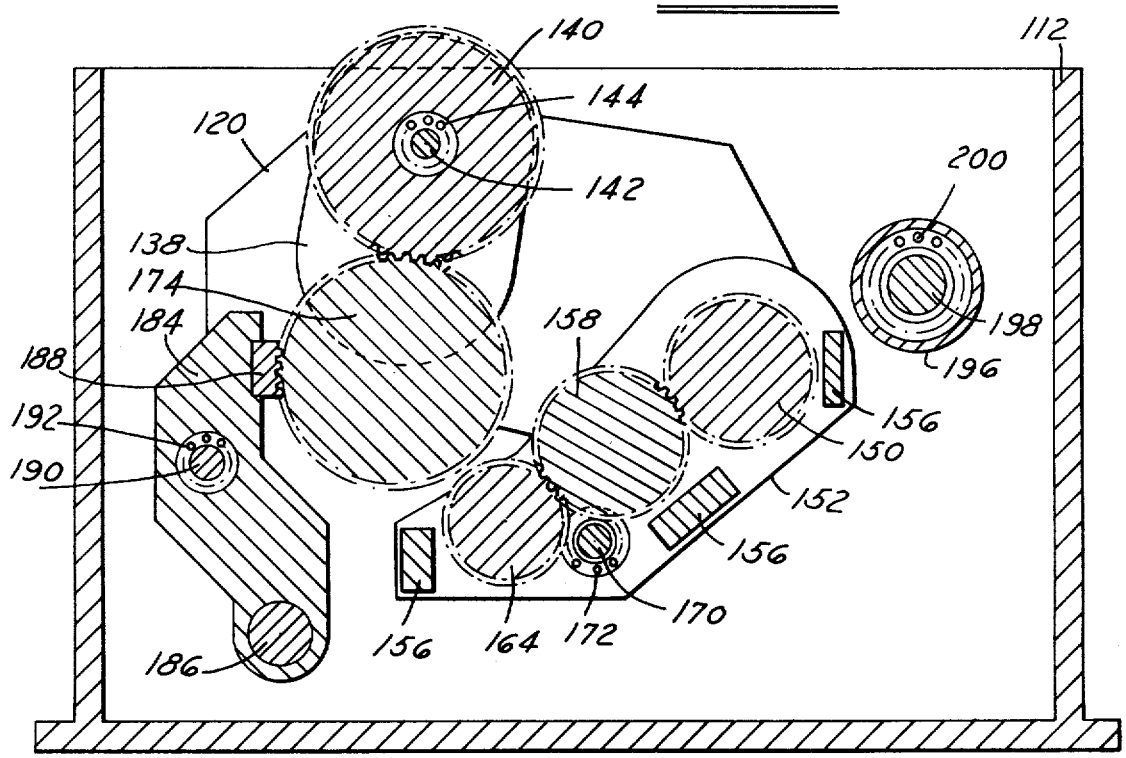
FIG. 20, a transverse section of the mechanism taken on line 20—20 of FIG. 17.
Figure 27:
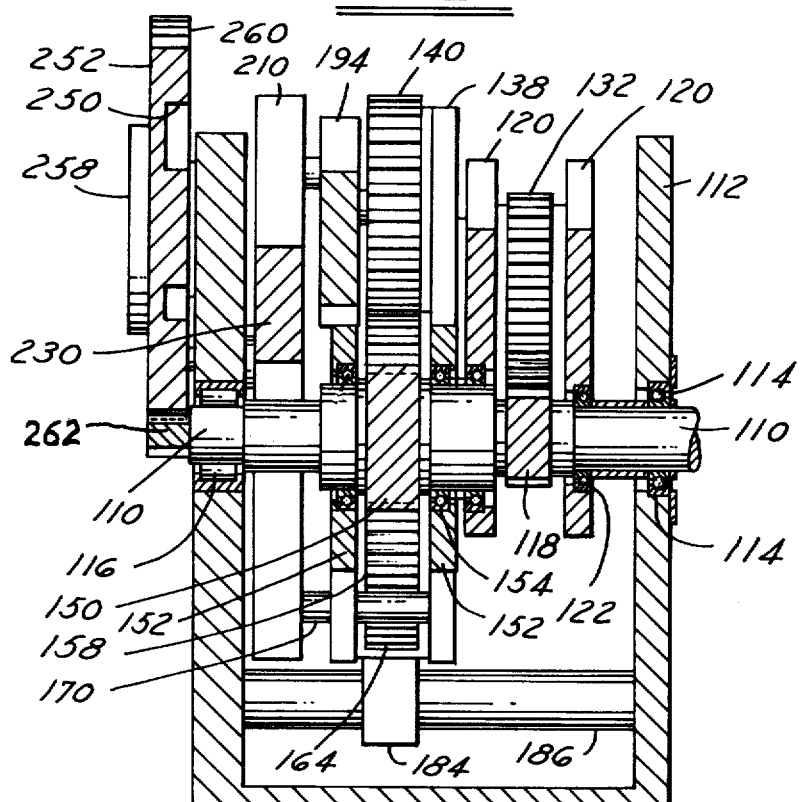
FIG. 27, a transverse section of the mechanism taken on line 27—27 of FIG. 17.
Figure 28:
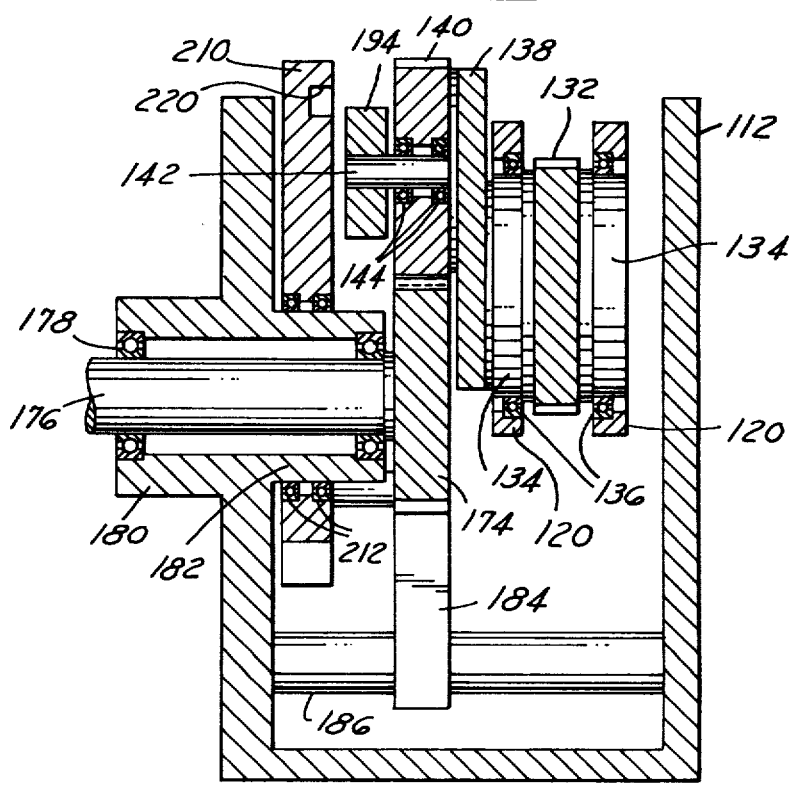
FIG. 28, a transverse section of the mechanism taken on line 28—28 of FIG. 17.

The structure of the CV mechanism of this embodiment is shown in FIGS. 17, 20, 21 and 27. A secondary input gear 150 is also integrally formed on the input shaft 110. A link is formed of two side plates 152 journalled on the input shaft 110 through bearings 154; the side plates 152 are separated by and bolted together through spacer blocks 156 (FIG. 20). An intermediate gear 158 formed with integral shouldered stub shafts 160 is journalled in the side plates 152 through bearings 162; this intermediate gear 158 is also formed to mesh with the secondary input gear 150. A driving gear 164 (FIG. 21), again formed with integral shouldered stub shafts 166, is also journalled in the side plates 152 through bearings 168. This driving gear 164 is formed to mesh with the intermediate gear 158 and therefore is driven through the intermediate gear 158 from the secondary input gear 150. A cam follower roller 170 (FIG. 27) is mounted in the sideplates 152 through bearings 172; it is used to control the angular position of the side-plates 152, and the gear train mounted therein, about the axis of the input shaft 110, as will be subsequently described. The items numbered 150-172 constitute the CV mechanism of this embodiment. cl Output Shaft Assembly The output shaft assembly is shown in FIGS. 17, 20 and 28 in this embodiment. An output gear 174 is mounted on an output shaft 176 journalled to the housing 112 through bearings 178 (FIG. 28). It will be noted that the housing 112 is formed with an external boss 180 and an internal boss 182 to support the bearings 178. The output gear 174 is formed to mesh with the eccentric gear 140 and/or the driving gear 164. In this application, the output gear 174 has the same pitch diameter as the eccentric gear 140.

The Holding Mechanism

The holding mechanism is shown in FIGS. 17, 20, 21 and 28. A holding link 184 is mounted on a shaft 186 suitably journalled in the housing 112 (FIG. 20). A rack section 188 is mounted on the link 184 and is formed to mesh with the output gear 174 when the link 184 is positioned in its extended position. A cam follower roller 190 is journalled in the link 184 through bearings 192; it will be used to control the position of the holding link as will be subsequently described.

Control Link

Figure 21:
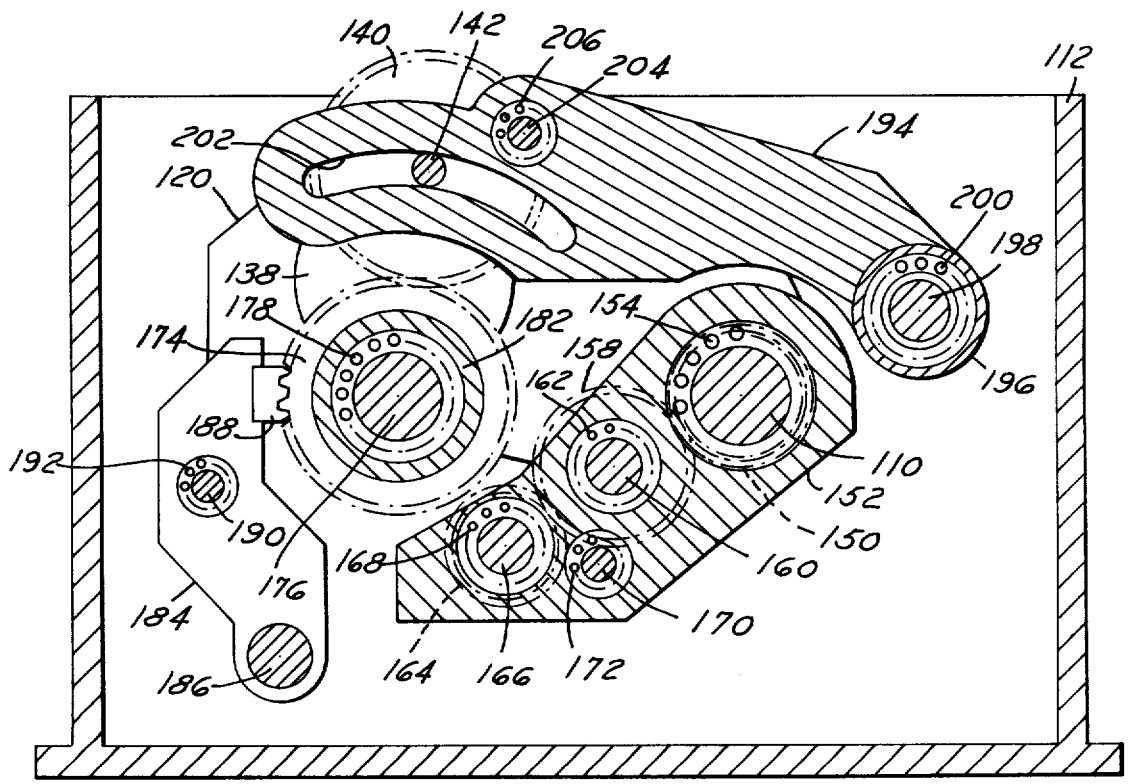
FIG. 21, a transverse section of the mechanism taken on line 21—21 of FIG. 17.

Referring to FIGS. 17, 21, and 28, a control link 194 (FIG. 21) is formed into a boss 196 at its one end. This boss 196 is journalled to an auxiliary shaft 198 through bearings 200; the auxiliary shaft 198 is separately journalled into the housing 112 (FIG. 17). An arcuate slot 202 is formed into the control link 194, which is engaged by the cam follower roller 142 mounted in the eccentric gear 140 of the AD mechanism. In turn, a cam follower roller 204 is mounted in the control link 194 through bearings 206; this cam follower roller 204 is used to control the position of the control link 194 about the axis of the auxiliary shaft 198 as will subsequently be described. In the most counterclockwise position of the control link 194, the arcuate slot 202 forms a true arc about the center of the output gear 174, and it is in this position that the cam follower roller 142 holds the eccentric gear 140 in engagement with the output gear 174.

The Spider Cam

Referring to FIGS. 17, 22, and 28, a spider cam 210 is journalled on the outer diameter of the internal boss 182 on the housing 112 through bearings 212; the spider cam 210 is therefore able to be rotated about the axis of the output shaft 176 since the boss 182 is concentric therewith. The spider cam 210 is comprised of three arms: arm 214, associated with the control of the AD mechanism; arm 216, associated with the control of the CV mechanism; and arm 218, associated with the control of the holding mechanism. A contoured cam slot 220 is milled into the spider arm 214; it is engaged by the cam follower roller 204 on the control link 194; this cam slot 220 controls the position of the control link 194 and through it the engagement or disengagement of the eccentric gear 140 with the output gear 174.

A contoured cam slot 222 is milled into the spider arm 216; it is engaged by the cam follower roller 170 journalled in the side plates 152 of the CV mechanism. This cam slot 22 therefore controls the engagement or disengagement of the driving gear 164 with the output gear 174. Five reference lines, marked P1-P5, are positioned on the spider arm 216 in FIG. 22. These are used as a means of defining the angular position of the spider cam 210 about the axis of the output shaft. The spider cam 210 is shown in the P2 position, i.e., the reference line P2 intersects the center of the cam follower roller 170. When the spider cam 210 is rotated counterclockwise through some small angle until the reference line P1 intersects the center of the cam follower roller 170, the position attained is defined as its P1 position. Similarly, through slight clockwise rotations of the spider cam 210, the P3, P4, and P5 positions can be reached, where in each case the position is defined as that position in which the corresponding reference line intersects the centerline of the cam follower roller 170.

A contoured cam slot 224 is milled into the spider arm 218; it is engaged by the cam follower roller 190 journalled in the holding link 184. The cam slot 224 therefore controls the engagement or disengagement of the rack section 188 with the output gear 174.

As shown in FIG. 22, the three cam slots 220, 222 and 224 are configured to create the conditions of engagement or disengagement of the three controlled mechanisms according to the following table.

TABLE I

| Position of Spider Cam 210 | Condition of AD Mechanism to Output Gear 174 | Condition of CV Mechanism to Output Gear 174 | Condition of Hold Mechanism to Output Gear 174 |
|---|---|---|---|
| P1 | Disengaged | Disengaged | Engaged |
| P2 | Engaged | Disengaged | Engaged |
| P3 | Engaged | Disengaged | Disengaged |
| P4 | Engaged | Engaged | Disengaged |
| P5 | Disengaged | Engaged | Disengaged |

Actuation of the Spider Cam

It will be recalled that, in the schematic embodiment, as shown in FIG. 15, the spider cam was actuated by a three position cylinder. In this embodiment, the spider cam is directly mechanically actuated.

Referring to FIGS. 17, 22, 23 and 24, a drive arm 230 is mounted on the auxiliary shaft 198, which, as noted earlier, is journalled in the housing 112; the outboard end of this drive arm 230 is formed into an open parallel sided slot 232 whose sides are substantially parallel to a radial line through the center of the slot 232 which intersects the axis of the auxiliary shaft 198. A slide block 234 is closely fitted into the slot 232; this block 234 is journalled on a pin 236 (FIG. 23) mounted on two extensions 238 on the spider cam 210. It can be seen, therefore, that over a small range of angles, a movement imparted to the drive arm 230 about its axis of rotation on the auxiliary shaft 198 is imparted to the spider cam 210, moving about its own axis of rotation about the axis of the output shaft 176.

Referring also to FIGS. 25 and 26, a boss 240 is formed into the drive arm 230. A cam follower roller 242 is mounted into the boss 240 and drive arm 230 through bearings 244 and 246. The boss 240 extends through a slot 248 in the housing 112; this permits the cam follower roller 242 to engage a cam groove 250 in a master cam 252 mounted on the outside of the housing 112. The master cam 252 rotates on bearings 254 mounted on a stub shaft 256 mounted on the housing 112 and held in axial position by a cover 258. The periphery of the master cam 252 is formed into gear teeth 260 which mesh with a pinion 262 at the outboard end of the input shaft 110 (FIG. 27).

The groove 250 is configured to create the desired movements of the spider cam 210 and through it the interrelated movements of the AD mechanism, the CV mechanism and the holding mechanism. Because the master cam 252 is mechanically driven by the input shaft 110, the proper timing or synchronization of the movements is assured if properly designed.

The illustrative cam groove 250 in master cam 252 is designed to create two modules of holding, one module of acceleration, two modules of constant velocity, and one module of deceleration. A series of reference radial lines are superimposed on the cam groove 250 denoted M0 to M13. The cam 252 is shown in an angular position such that the cam follower roller 242 is at reference line M2 with respect to the cam slot; in this position, the eccentric gear 140 and the rack section 188 are both simultaneously in engagement with the output gear 174. The other conditions of engagement at each of the other reference lines is shown in Table II below.

TABLE II

| Position of Master Cam 252 | Position of Spider Cam 210 | Condition of AD Mechanism to Output Gear 174 | Condition of CV Mechanism to Output Gear 174 | Condition of Hold Mechanism to Output Gear 174 |
|---|---|---|---|---|
| M0  | P1 | Disengaged | Disengaged | Engaged |
| M1  | P1 | Disengaged | Disengaged | Engaged |
| M2  | P2 | Engaged    | Disengaged | Engaged |
| M3  | P3 | Engaged    | Disengaged | Disengaged |
| M4  | P3 | Engaged    | Disengaged | Disengaged |
| M5  | P4 | Engaged    | Engaged    | Disengaged |
| M6  | P5 | Disengaged | Engaged    | Disengaged |
| M7  | P5 | Disengaged | Engaged    | Disengaged |
| M8  | P5 | Disengaged | Engaged    | Disengaged |
| M9  | P4 | Engaged    | Engaged    | Disengaged |
| M10 | P3 | Engaged    | Disengaged | Disengaged |
| M11 | P3 | Engaged    | Disengaged | Disengaged |
| M12 | P2 | Engaged    | Disengaged | Engaged |
| M13 | P1 | Disengaged | Disengaged | Engaged |

It will be noted from Table II that at the positions of the master cam 252, M2, M5, M9, and M12 two mechanisms are simultaneously engaged with the output gear 174. This is a momentary condition only, for as one mechanism reaches full engagement with the output gear 174, the other mechanism begins to disengage. Since the pressure angle of the gear teeth creates a natural taper, this is a permissible technique to use; furthermore, with this momentary simultaneous engagement of two mechanisms with the output gear 174, it is impossible for the output gear to be even momentarily uncontrolled.

Figure 29:
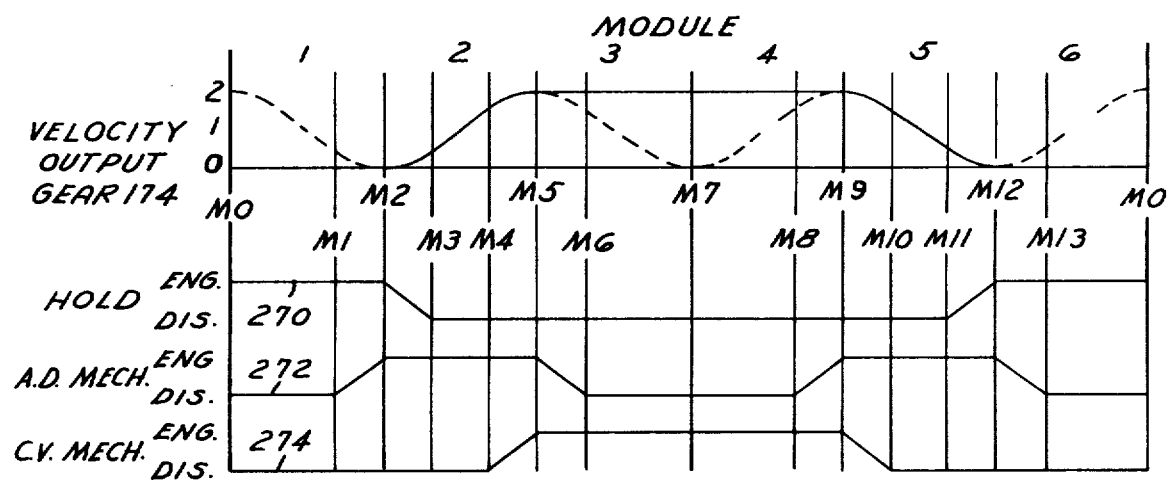
FIG. 29, a composite timing diagram of an illustrative cycle showing output velocity and the timeposition relationship of the various engaging mechanisms.

A composite timing diagram for the system, corresponding to the control function of the cam groove 250, is shown in FIG. 29. The upper curve represents the velocity of the output gear 174 and is analogous to FIG. 12 except that two modules of holding have been added. It can be seen that an entire cycle, represented by one revolution of the master cam 252, consists of six modules, which are arbitrarily numbered from the center of the holding range. Referring to the velocity graph of FIG. 29, it can be seen, that during the first module, the output gear 174 is stationary; during the second module, it accelerates to maximum velocity; during the third and fourth module, the output gear 174 operates at constant velocity; during the fifth module, it decelerates back to a standstill; and during the sixth module, it remains stationary. On this same velocity graph is superimposed a dotted line which represents the hypothetical velocity of the output gear 174, if the eccentric gear 140 remained engaged with the output gear 174, and the driving gear 164 and rack section 188 remained engaged. It will be noted that the reference lines M0–M13 have been superimposed on FIG. 29 and correspond in time relationship with the lines so marked on FIG. 25. Reference lines M0, M2, M5, M7, M9 and M12 coincide with the lines separating the modules.

Directly below the velocity diagram are added three schematic time position diagrams for the three mechanisms which selectively engage and disengage the output gear 174. The upper diagram shown by line 270 indicates the engaged and disengaged status of the holding mechanism during a cycle. Similarly, the diagrammatic line 272 indicates the engaged and disengaged status of the AD mechanism during a cycle; and, finally, the bottom line 274 indicates the engaged and disengaged status of the CV mechanism during a cycle. This cycle of six modules will repeat endlessly as long as the prime mover which drives the input shaft rotates in a given direction. In situations in which unidirectional operation is desired, together with a longer dwell than is provided by the two modules of hold, the prime mover may be stopped at any time during the hold modules. Since the output gear 174 will already be stationary as a function of the overall mechanism characteristics, such a stopping position of the prime mover and the input shaft is very non-critical.

In reversing applications, the prime mover and input shaft must stop at the end of each cycle, but the stopping point is again very non-critical. After an index in the one direction as shown by FIG. 29, the prime mover and input shaft can stop at any point after module 5, as defined by reference line M12; the amount that the system moves into module 6, or even into module 1 is of no consequence insofar as the position of the output gear is concerned. It is clear that the mechanism can operate equally well in either direction; therefore, to reverse the mechanism, the prime mover and input shaft are rotated in the reverse direction and the overall mechanism executes the functions of modules 5, 4, 3, and 2 in that order, bringing the output shaft 176 to a stop as module 1 is reached. Again, the amount that the system moves into module 1, or even into module 6, is of no consequence insofar as the position of the output gear is concerned. However, the amount the system moves into the hold modules, 1 or 6, at the end of each reversing index is of consequence insofar as the time required for a given index is concerned, since the time required to retrace the distance moved into a given hold module is added to the time required for the next reversing cycle. Accordingly, it is desirable to move into the hold modules, 1 or 6, at the ends of the actual index movement (modules 2, 3, 4 and 5) as little as possible to reduce the overall cycle times.

The cam 252, with its cam groove 250, is illustrative only, and causes the embodiment of FIGS. 17-28 to execute the movement sequence of FIG. 29, which is three revolutions of the output shaft made of ½ revolution of acceleration, 2 revolutions of constant velocity, and ½ revolution of deceleration. This is true for operation in either direction.

Other program sequences can be designed into the master cam 252, consistent with the simple rules to be reiterated. The gear ratio between the input shaft pinion 262 and the gear 260 on the periphery of the master cam 252 determines the total number of modules for an overall cycle; this is shown as 6 modules in FIG. 25. By changing this gear ratio, it is possible to design and utilize a master cam which provides 8, 10, or more modules per cycle.

The design provisions or rules in designing a master cam can be stated as follows:

1. A module consists of an interval in terms of time or input shaft angle from a dwell window to a CV window, as earlier defined, or vice versa. Such a module also comprises the time or input shaft angle required to rotate the eccentric gear 140 through substantially ½ revolution.

2. The acceleration of the output gear 174 from a dwell to a maximum velocity condition requires 1 module, during which it rotates through ½ revolution, if the eccentric gear 140 and output gear 174 are the same diameter.

3. The deceleration of the output gear 174 from a maximum velocity condition to a dwell condition also requires one module, during which it also rotates through ½ revolution, if the eccentric gear 140 and the output gear 174 are the same diameter.

4. In a complete cycle, there must be one deceleration module for every acceleration module to prevent discontinuities in output gear velocity. Therefore, the sum of acceleration modules and deceleration modules must be even (2, 4, 6, etc.).

5. The positions of CV windows occur at like angular positions of the eccentric gear 140, which positions are one or more revolutions apart. Since a module is substantially ½ revolution of the eccentric gear 140, the CV windows are always spaced 2 modules apart; therefore, the number of CV modules must also always be even.

6. The positions of the dwell windows also occur at like angular positions of the eccentric gear 140, which positions are also one or more revolutions apart; therefore, the number of dwell or hold modules must also always be even.

7. Since the number of CV modules and dwell modules must each always be even, and since the sum of the acceleration and deceleration modules must be even, it follows that the total number of modules controlled by a master cam must also always be even.

8. Finally, it is clear, that an acceleration module must always be used in transition from a dwell module to a constant velocity module, and a deceleration module must be used in transition from a constant velocity module to a dwell module, bearing in mind that when the mechanism is reversed, an acceleration module becomes a deceleration module and vice versa.

Within the framework of the above stated rules, it is possible to design a master cam to create any predetermined pattern of motion, which is, of course, repeated during each revolution of said cam. Or, if the prime mover and input shaft are reversed, the cam also turns in the opposite direction, reversing the pattern. For an arrangement such as in FIG. 29, where the pattern of movement is symmetrical, a reversal maintains the same pattern.

It can be seen that as the number of modules in a total cycle is increased, the gear ratio between the pinion 262 and gear 260 on the master cam must be increased. The cam rise ramp angles of the cam groove 250 also will increase as the number of modules that correspond to one revolution of the cam is increased, since the radial rise of the cam groove is compressed into a smaller angular distance on the cam. The number of modules which correspond to one revolution of the master cam is therefore limited by the maximum workable cam groove 250 rise angles which must follow good engineering practice. There are two ways in which the number of modules in a given cycle may be increased. One is to make the master cam 252 larger, thereby increasing the length of the cam groove 250. The second is to replace the constant velocity drive system between the input shaft 110 and master cam 252, as represented by the pinion 262 and gear 260, with an intermittent drive system. Such an intermittent drive system could consist of a connection as simple or conventional as the well known Geneva mechanism with the input shaft 110 as the driving member and the master cam as the driven member, either directly, or through an intermediate Geneva output (slotted) member. Any of the standard cam index mechanisms could also advantageously be interposed between the input shaft 110 and the master cam 252.

The introduction of an intermittent motion mechanism, such as the Geneva or cam mechanisms, especially those having a long dwell, would cause the master cam 252 to move forward in discrete imcrements separated by larger periods of dwell. For example, a conventional Geneva mechanism having a 90° output movement has a cycle in which the output member is stationary for 270° of input movement, then moves through its output angle of 90° during 90° of input movement; in other words, ¾ dwell time to ¼ movement time. By properly phasing such an intermittent motion mechanism to create an intermittent motion of the master cam 252 from the input shaft 110, it becomes possible to reduce the rise angles in the cam groove 250 as compared to the pinion and gear drive.

In the foregoing description of the mechanisms, it was shown that the acceleration of the output gear occurred during one half revolution; and that the deceleration also occurred during one half revolution thereof. This condition was created by having the eccentric gear the same diameter as the output gear, such that the full acceleration-deceleration of the output gear, without shifts, occurs during one revolution of that output gear.

However, the techniques described above can also be applied to systems in which the eccentric gear and the output gear are not of identical size. As an example, let the eccentric gear be one half the diameter of the output gear. Then in a non-switched operation, the output gear would move through a complete acceleration-deceleration cycle from dwell to dwell in one half revolution; this corresponds to one full revolution of the eccentric gear, as is always the case. Presuming that the acceleration-deceleration profile has been made sufficiently close to that of a pure cycloid by appropriate control of the geometric parameters, it can be seen that the output gear moves from a dwell window to peak velocity at a CV window in one quarter revolution thereof. The time required to do this is again defined as one module; and the time required for the output gear to decelerate from peak velocity at a CV window to a dwell window will also be one module, during which interval it rotates through ¼ revolution. Further, since for a cycloid, the peak velocity is double the average velocity, the distance moved by the output gear in one module, if it moves at a constant speed which is the same as the cycloidal peak speed, will be twice the distance it would move in an accelerating or decelerating module. Therefore, in a constant velocity module, it would move through one half revolution, which is twice the one quarter revolution moved during either the accelerating or decelerating module. The CV windows would still be spaced two modules apart as earlier noted. A four module cycle, analogous to FIG. 12, would exhibit the following characteristics. During the first module, the output gear accelerates to peak velocity and reaches the CV window after rotating one quarter revolution; and an upshift occurs; during the next two modules, the output gear rotates at constant velocity and rotates through one complete revolution to reach the next CV window where a downshift occurs. During the fourth and final module, the output gear decelerates from the CV window to a dwell window while rotating through one quarter revolution. The total rotation of the output gear during all four modules of the cycle is therefore 1½ revolutions.

In the general case where the ratio of the eccentric gear diameter to the output gear diameter is given by R, the number of revolutions made by the output gear during an acceleration-deceleration cycle without shifting or constant velocity is R revolutions. During an accelerating module from a dwell window to a CV window, or during a decelerating module from a CV window to a dwell window, the number of revolutions made by the output gear is R/2 revolutions. During a constant velocity module, the number of revolutions made by the output gear is 2×R/2 or R revolutions. For a total cycle of N modules, exclusive of hold modules, it will be recalled that N-2 modules are used for constant velocity. Therefore, the total number of revolutions, M, made by the output gear of a system having a ratio of R and operating on an N module cycle is the sum of the following:

R/2 revolutions during acceleration
R(N−2) revolutions during constant velocity
R/2 revolutions during deceleration Therefore, $M = R/2 + R(N-2) + R/2$
$M = R + R(N-2)$
$M = R(N-1)$ It will be recalled that N must always be an even number and with this limitation, when R is 1, as in the specific mechanisms described, M can be 1, 3, 5, 7, etc. Therefore, if it is desired that M be some even number such as 2, then $2 = R(N-1)$ For a 4 module cycle, N=4, whereupon R=⅔; for a 6 module cycle, N=6, and R=2/5. In a general sense, by being able to vary R, it becomes possible to design an overall system having an even number of modules and any reasonable number of output revolutions, integral or rational.

In the invention described above, the AD mechanism utilized the system disclosed in my U.S. Pat. No. 3,789,676. This system does not include the addition of higher harmonic components. An accelerating-decelerating mechanism which does incorporate the addition of higher harmonic components is disclosed in my U.S. Pat. No. 4,075,911. The relevant embodiments of this U.S. Pat. No. 4,075,911 can also be utilized in this present invention. It will be noted from this existing patent that a higher harmonic component can be added to the kinematic characteristics of the AD (accelerating-decelerating) mechanism by introducing an eccentricity between the axis of the input shaft and the axis of the input drive gear which latter axis is also the pivot axis of the link associated with the AD mechanism. It is comparatively simple to add this eccentricity to this present invention as is shown in FIG. 30 which is to be compared to FIG. 19.

Figure 30:
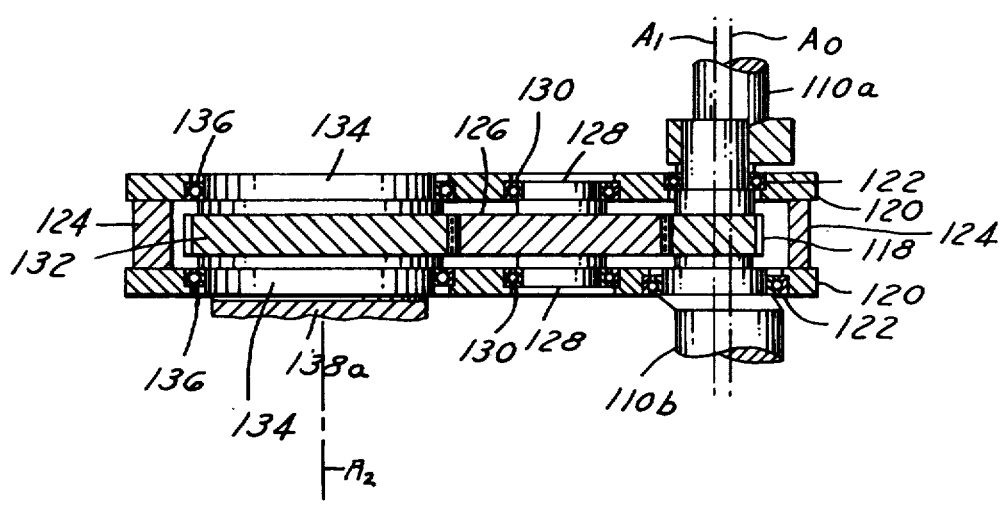
FIG. 30, a transverse section of a second embodiment, analogous to FIG. 19 showing means to incorporate a higher harmonic as disclosed in my U.S. Pat. No. 4,075,911.

Referring to FIG. 30, a revised two-piece input shaft 110a and 110b (for assembly purposes) is mounted as before in suitable bearings in the support housing and rotates on an axis $A_0$. The input gear 118 is centered on an eccentric axis $A_1$ displaced some small distance from the axis $A_0$. The side plates 120 are journalled on the input shaft 110a, 110b through bearings 122 which are concentric with the eccentric axis $A_1$. The remainder of the gear train, bearings, and other components of the AD mechanism are the same as described in connection with FIG. 19, except that the cheekplate 138a is slightly altered to provide for a compensating revised eccentricity between the driving gear 132 and the eccentric gear 140. The remainder of the input shaft 110a, 110b is unaltered from the configuration described in connection with FIGS. 19 and 27. Specifically, the secondary input gear 150 remains concentric with the axis $A_0$ of the input shaft 110a, 110b as do the seats for the bearings 154 (FIG. 21).

As will be noted from the kinematic explanations in my U.S. Pat. No. 4,075,911, the addition of a higher harmonic component creates a large degree of kinematic design flexibility. Specifically, when this feature is incorporated into this present invention, it becomes possible to design a kinematic behavior for the AD mechanism such that the inherent natural dwell is significantly improved and, simultaneously, the velocity can be made to remain more nearly constant over a longer range in the midstroke region. Stated another way, both the dwell window and CV window can be enlarged. This makes the shift points less critical and permits more time or input shaft angle for shifting. This in turn permits lower ramp angles on both the spider cam and master cam.

The specific camming arrangement shown in this invention employs a three armed spider cam which directly controls the positions of the AD mechanism, the CV mechanism, and the holding mechanism; and this spider cam in turn is controlled by a master cam. In other words, one cam drives another. It is also possible to devise a camming arrangement in which a suitable camshaft, driven by the input shaft at some appropriate ratio, carries three separate cams, one of which controls the position of the AD mechanism, another controls the position of the CV mechanism, and the third controls the position of the holding mechanism, each controlling its mechanism either directly or through some conventional linkage.

The incorporation of a holding mechanism which comprises elements 184-192 is useful in creating a far longer dwell of the output member than is attainable without it. However, in some few applications, generally those which operate at relatively low speed, the natural dwell of the accelerating-decelerating mechanism is sufficient and the holding mechanism can be deleted. In such designs, it is further possible to delete the arm 218 with its cam groove 224 on the spider cam 210 for manufacturing economies; the positions P1 and P2 (FIG. 22) for the spider cam 210 would be deleted and it would operate only between positions P3, P4, and P5, and this would reflect into the design of the master cam 252. With these simplifications, the mechanism could only operate in the accelerating-decelerating mode or in the constant velocity mode and the only dwell would be the natural dwell of the accelerating-decelerating mechanism.

In the various embodiments shown herein, the driving connection between the input gear to the driving gear, as from input gear 118 to driving gear 132, was shown as being made through an intermediate gear, as gear 126. It can be seen that the intermediate gear may be replaced by a driving connection employing sprockets and chains, or, for lightly loaded applications, even cog-type belts and pulleys. Such connections are shown in my existing U.S. Pat. Nos. 3,789,676 and 4,075,911. Similarly, the intermediate gear of the constant velocity mechanism, such as gear 158, may be replaced by such other driving connections.

I claim:

1. A reversible rotary indexing mechanism capable of generating large indexing angles, including those exceeding one revolution, which comprises:

(a) a frame,
(b) output means mounted for rotation in said frame,
(c) input means mounted for rotation in said frame, (d) accelerating-decelerating drive means operatively associated with said input means and selectively engageable with said output means and, when engaged with said output means and driven by a constant predetermined velocity of said input means, drives said output means at a cyclically varying velocity accelerating from a substantially zero velocity to a predetermined maximum velocity and then decelerating to a substantially zero velocity in a repetitive cycle, (e) constant velocity drive means operatively associated with said input means and selectively engageable with said output means, and, when engaged with said output means and driven by said constant predetermined velocity of said input means, drives said output means at a constant velocity substantially equal to said predetermined maximum velocity, and (f) shifting means operatively associated with said accelerating-decelerating means and with said constant velocity means, and adapted to disengage said accelerating-decelerating means from said output means at its said predetermined maximum velocity and substantially simultaneously to engage said constant velocity means with said output means, and further adapted to subsequently disengage said constant velocity means from said output means and substantially simultaneously to re-engage said accelerating-decelerating means with said output means at a position in the cycle of said accelerating-decelerating means when it drives said output means at said predetermined maximum velocity.

2. A mechanism as in claim 1 which further comprises holding drive means mounted in said frame and selectively engageable with said output means, and, when engaged with said output means, holds said output means from movement, and said shifting means is further operatively associated with said holding drive means and adapted to disengage said accelerating-decelerating means from said output means at its said zero velocity and substantially simultaneously to engage said holding drive means with said output means, and said shifting means is further adapted to subsequently disengage said holding drive means from said output means and substantially simultaneously to reengage said accelerating-decelerating means with said output means at a position in the cycle of said accelerating-decelerating drive means when it drives said output means at said zero velocity.

3. A mechanism as in claim 1 in which said accelerating-decelerating drive means imparts to the output means, when selectively engaged therewith, a cyclically and smoothly varying velocity periodically reaching substantially zero velocity and in which the average velocity during any one cycle is substantially one-half the maximum velocity reached during said one cycle.

4. A mechanism as in claim 3 in which said accelerating-decelerating drive means imparts to the output means, when selectively engaged therewith, a motion substantially identical with the motion commonly referred to as cycloidal motion.

5. A mechanism as in claim 1 in which said accelerating-decelerating drive means comprises:

(a) a first drive member concentrically mounted on said input means and rotating about a first axis, (b) support means mounted for oscillation about said first axis, (c) a second drive member mounted for rotation in said support means and rotating about a second axis displaced from said first axis, (d) means connecting for rotation said first drive member and said second drive member, (e) an eccentric member concentric about a third axis displaced from said second axis and mounted on said second drive member and adapted to drive said output means, and (f) guide means controlling the path of said third axis of said eccentric member selectively movable between two positions: a first position in which said eccentric member is held out of engagement with said output means, and a second position in which said eccentric member is held in engagement with said output means as said third axis on said eccentric member oscillates along an arcuate path substantially equidistant from the axis of said output means.

6. A mechanism as in claim 1 in which said output means comprises an output gear and in which said accelerating-decelerating drive means comprises:

(a) a first drive member concentrically mounted on said input means and rotating about a first axis, (b) support means mounted for oscillation about said first axis, (c) a second drive member mounted for rotation in said support means and rotating about a second axis displaced from said first axis, (d) means connecting for rotation said first drive member and said second drive member, (e) an eccentric gear concentric about a third axis displaced from said second axis and mounted on said second drive member and adapted to mesh with said output gear, and (f) guide means controlling the path of said third axis of said eccentric gear selectively movable between two positions: a first position in which said eccentric gear is held out of engagement with said output gear, and a second position in which said eccentric gear is held in engagement with said output gear as said third axis on said eccentric gear oscillates along an arcuate path substantially equidistant from the axis of said output gear.

7. A mechanism as in claim 6 in which said eccentric gear has mounted thereon a stub shaft concentric about said third axis, and said guide means comprises a guide member pivotally supported from said frame and containing an arcuate slot adapted to control the path of said stub shaft and said guide member is selectively movable between two positions: a first position in which said arcuate slot holds said eccentric gear out of engagement with said output gear, and a second position in which the center of curvature of said arcuate slot is substantially coincident with the center of said output gear and said eccentric gear is held in engagement with said output gear as said stub shaft oscillates in said arcuate slot.

8. A mechanism as in claim 7 in which the radius of said arcuate slot is substantially equal to the sum of the pitch radius of the eccentric gear and the pitch radius of the output gear.

9. A mechanism as in claim 6 in which said first drive member comprises a first gear and in which said second drive member comprises a second gear and in which said means connecting for rotation comprises an intermediate gear interposed between said first gear and said second gear.

10. A mechanism as in claim 1 in which said input means rotates about a first axis and said accelerating-decelerating means comprises:
   (a) a first drive member concentric about a second axis and eccentrically mounted on said input means with said second axis displaced from said first axis,
   (b) support means mounted for oscillation about said second axis,
   (c) a second drive member mounted for rotation in said support means and rotating about a third axis displaced from said second axis,
   (d) means connecting for rotation said first drive member and said second drive member, whereby said first drive member rotates an integral number of revolutions for each revolution of said second drive member,
   (e) an eccentric member concentric about a fourth axis displaced from said third axis and mounted on said second drive member and adapted to drive said output means, and
   (f) guide means controlling the path of said fourth axis of said eccentric member selectively movable between two positions: a first position in which said eccentric member is held out of engagement with said output means, and a second position in which said eccentric member is held in engagement with said output means as said fourth axis on said eccentric member oscillates along an arcuate path substantially equidistant from the axis of said output means.

11. A mechanism as in claim 1 in which said input means rotates about a first axis and in which said output means comprises an output gear and in which said accelerating-decelerating drive means comprises:
   (a) a first drive member concentric about a second axis and eccentrically mounted on said input means with said second axis displaced from said first axis,
   (b) support means mounted for oscillation about said second axis,
   (c) a second drive member mounted for rotation in said support means and rotating about a third axis displaced from said second axis,
   (d) means connecting for rotation said first drive member and said second drive member, whereby said first drive member rotates an integral number of revolutions for each revolution of said second drive member,
   (e) an eccentric gear concentric about a fourth axis displaced from said third axis and mounted on said second drive member and adapted to mesh with said output gear, and
   (f) guide means controlling the path of said fourth axis of said eccentric gear selectively movable between two positions: a first position in which said eccentric gear is held out of engagement with said output gear, and a second position in which said eccentric gear is held in engagement with said output gear as said fourth axis on said eccentric gear oscillates along an arcuate path substantially equidistant from the axis of said output gear.

12. A mechanism as in claim 11 in which said eccentric gear has mounted thereon a stub shaft concentric about said fourth axis, and said guide means comprises a guide member pivotally supported from said frame and containing an arcuate slot adapted to control the path of said stub shaft and said guide member is selectively movable between two positions: a first position in which said arcuate slot holds said eccentric gear out of engagement with said output gear, and a second position in which the center of curvature of said arcuate slot is substantially coincident with the center of said output gear and said eccentric gear is held in engagement with said output gear as said stub shaft oscillates in said arcuate slot.

13. A mechanism as in claim 11 in which the radius of said arcuate slot is substantially equal to the sum of the pitch radius of the eccentric gear and the pitch radius of the output gear.

14. A mechanism as in claim 11 in which said first drive member comprises a first gear and in which said second drive member comprises a second gear and in which said means connecting for rotation comprises an intermediate gear interposed between said first gear and said second gear.

15. A mechanism as in claim 1 in which said constant velocity drive means comprises:
   (a) a first drive member concentrically mounted on said input means and rotating about a first axis,
   (b) support means mounted for movement about said first axis,
   (c) a second drive member mounted for rotation in said support means and rotating about a second axis displaced from said first axis and adapted to drive said output means, and
   (d) means connecting for rotation said first drive member and said second drive member.

16. A mechanism as in claim 1 in which said output means comprises an output gear and in which said constant velocity drive means comprises:
   (a) a first gear concentrically mounted on said input means and rotating about a first axis,
   (b) support means mounted for movement about said first axis,
   (c) a second gear mounted for rotation in said support means and rotating about a second axis and adapted to drive said output gear, and
   (d) means connecting for rotation said first gear and said second gear.

17. A mechanism as in claim 16 in which said means connecting for rotation comprises an intermediate gear mounted for rotation on said support means and interposed between said first gear and said second gear.

18. A mechanism as in claim 1 in which said shifting means comprises: cam means operatively associated with said accelerating-decelerating drive means and with said constant velocity drive means and adapted to selectively engage said drive means with said output means.

19. A mechanism as in claim 18 in which said cam means is actuated by cylinder means.

20. A mechanism as in claim 18 in which said cam means is driven by said input means.

21. A mechanism as in claim 18 in which said cam means comprises:
   (a) a first cam member pivotally mounted to rotate about the axis of said output means and having a first cam arm operatively associated with said accelerating-decelerating drive means and a second cam arm operatively associated with said constant velocity drive means, and
   (b) a second cam member mounted for rotation on said frame and driven by said input means and operatively associated with said first cam member.

22. A mechanism as in claim 2 in which said shifting means comprises cam means operatively associated with said accelerating-decelerating drive means, and with said constant velocity drive means and with said holding drive means and adapted to selectively engage said drive means with said output means.

23. A mechanism as in claim 22 in which said cam means is actuated by cylinder means.

24. A mechanism as in claim 22 in which said cam means is driven by said input means.

25. A mechanism as in claim 22 in which said cam means comprises:

(a) a first cam member pivotally mounted to rotate about the axis of said output means and comprising:
   1. a first cam arm operatively associated with said accelerating-decelerating drive means,
   2. a second cam arm operatively associated with said constant velocity drive means,
   3. a third cam arm operatively associated with said holding drive means, and
(b) a second cam member mounted for rotation on said frame and driven by said input means and operatively associated with said first cam member.

* * * * *